US006532058B2

United States Patent
Schaub et al.

(10) Patent No.: US 6,532,058 B2
(45) Date of Patent: Mar. 11, 2003

(54) PHOTOGRAPHIC SCANNER WITH FOCUS CONTROL

(75) Inventors: Heiner Schaub, Wettingen (CH); Willy Koch, Otelfingen (CH); Hansjorg Rotach, Effretikon (CH); Peter Kobel, Spreitenbach (CH); Georg von Tobel, Wettingen (CH); Mathias Lehmann, Zurich (CH)

(73) Assignee: Gretag Imaging Trading AG, Wettingen (CH)

( * ) Notice: Subject to any disclaimer, the term of this patent is extended or adjusted under 35 U.S.C. 154(b) by 0 days.

(21) Appl. No.: 09/884,758

(22) Filed: Jun. 19, 2001

(65) Prior Publication Data

US 2001/0055106 A1 Dec. 27, 2001

(30) Foreign Application Priority Data

Jun. 23, 2000 (EP) .............................. 00113039

(51) Int. Cl.[7] .......................... G03B 27/52; G03B 27/58
(52) U.S. Cl. ............................. 355/55; 355/40; 355/72
(58) Field of Search ............................. 355/18, 38–41, 355/55, 72–75; 358/474, 487, 506

(56) References Cited

U.S. PATENT DOCUMENTS

| 4,531,830 | A |   | 7/1985  | Yuasa           | 355/56  |
|-----------|---|---|---------|-----------------|---------|
| 4,887,125 | A | * | 12/1989 | Hideshima       | 355/55  |
| 5,005,967 | A | * | 4/1991  | Kuriyama        | 353/101 |
| 5,285,235 | A | * | 2/1994  | Frick           | 355/41  |
| 5,394,205 | A |   | 2/1995  | Ochiai          | 353/101 |
| 5,552,855 | A | * | 9/1996  | Smart           | 355/41  |
| 5,565,912 | A | * | 10/1996 | Easterly et al. | 348/96  |
| 5,592,258 | A | * | 1/1997  | Hashizume et al.| 355/41  |
| 5,717,500 | A |   | 2/1998  | Ikeda           | 358/449 |
| 6,040,891 | A |   | 3/2000  | Makino          | 355/46  |

FOREIGN PATENT DOCUMENTS

| JP | 02232640 | * | 9/1990  |
| JP | 2295370  |   | 12/1990 |
| JP | 8292502  |   | 11/1996 |

* cited by examiner

*Primary Examiner*—Henry Hung Nguyen
(74) *Attorney, Agent, or Firm*—Weingarten, Schurgin, Gagnebin & Lebovici LLP

(57) ABSTRACT

Disclosed is a photographic capturing device for the capturing of photographic image information from photographic media with a light source, with a stage for the photographic medium to preset a reference position for the projection of the photographic medium by way of a projection optics onto a detection element which detects the light originating from the light source and modulated by the photographic medium according to the image information, whereby a sample carrier with a sample is provided for the control of the focus of the projected image, and a positioning mechanism which removably places the sample carrier at the reference position for projecting the sample onto the detection element by way of the projection optics.

19 Claims, 6 Drawing Sheets

PHOTOGRAPHIC SCANNER WITH FOCUS CONTROL

FIELD OF THE INVENTION

The invention relates to scanners for the capturing of photographic image information from photographic media, especially scanners for the scanning of films, or to photographic printers for the projection of individual image originals (frames) contained in a photographic film onto photographic paper. In particular, the present invention relates to the control or adjustment of the focus of the projection of a photographic medium (for example a film, transparent foil with image, photographic paper with image) onto a detection element (for example a photoelectric converter such as, for example, CCD or for example a photochemical converter, such as, for example, photographic paper) in such a photographic scanning arrangement.

BACKGROUND ART

Focussing of the projection is normally carried out in conventional photographic scanning arrangements (scanners) or in conventional photographic copier apparatus (printers) by way of a test film or a test negative which is mounted in place of a film on a film stage and in a preselected reference position. An operator must thereby manually position the test film into the film transport arrangement or must manually position and fasten a test negative on the film stage. The focus of the test image produced with the test film or the test negative is then judged by an operator and the position of the lens adjusted until a satisfactory result is achieved.

SUMMARY OF THE INVENTION

It is now an object of the invention to provide a photographic scanning arrangement where the focus testing or focussing is simplified and reproducable.

This object is achieved with a photographic capturing device in accordance with the invention including a sample or pattern for controlling the focus of the projection and a positioning mechanism for selectively positioning the sample or pattern in a reference position for projection of the sample or pattern onto a detection means.

The capturing device in accordance with the invention can be constructed as a photographic scanner, whereby a photoelectric converter (CCD) is used as the detection means. It can also be constructed as a photographic copier (printer) whereby a photochemical converter (photographic paper) is used as the detection means.

The photographic capturing apparatus includes a light source, such as, for example, a halogen lamp or light emitting diodes. The light of the light source is preferably focussed and directed by way of light conducting elements (object lenses, lenses, mirrors, shutters, etc.) to a stage which serves for the positioning of a photographic medium to be exposed. The spectrum of the light can be changed, for example, by way of filters or by activating light emitting diodes of different color. The light transmitted by the photographic medium is preferably measured by projecting the photographic medium onto a detector, however, the reflected light can also be captured by way of a projection optics. The detection means is suited to detect the light modulated by transmission or reflection in order to so capture the image information stored on the photographic medium. As already mentioned, a CCD and photographic paper are suitable detection elements.

The photographic capturing device preferably includes an arrangement for testing the focus of the projection and especially for adjusting the focus of the projection. This arrangement in accordance with the invention includes a so called sample or pattern carrier with a sample or pattern and a positioning mechanism for moving the sample carrier into a desired reference position. The mechanism is constructed such that the sample carrier is positioned at the same reference position for each measurement process for testing the focus. It is especially preferred to position the sample carrier each time in the same object plane (plane in which the object to be exposed is located). This provides a significant advantage compared to the use of test negatives and test films. Conventional test films or test negatives can curve towards the illumination means or the detection means whereby they leave a preselected object plane. The curvature can vary in direction and extent with the surrounding temperature, the orientation of the test negative or the type of test film or test negative. The sample or pattern carrier with sample in accordance of the invention is preferably constructed to be so stiff that the sample does not curve. For example, the sample carrier is constructed as a rigid metal mesh, whereby the shape of the grid represents the sample. The sample carrier preferably has a non-flexible or non-elastic or rigid substrate which carries, forms or surrounds the sample and in this way prevents a curving of the sample. The sample or pattern which is used for the testing of the focus of the exposure is constructed with sufficient contrast that it can be recognized by the detection means at least upon focussed projection. It can be, for example, a grid, circles or other geometric shapes. The substrate which carries the sample is preferably transparent, while the sample itself is not transparent, or vice-versa, in order to achieve the strongest light/dark contrast in the plane of projection. The sample carrier is preferably positioned at the same reference position in which the photographic medium is positioned for the scanning in the conventional operation of the capturing device. The reference position is selected such that the sample is located in the preselected object plane.

In the following, the expression "sample carrier" is used as a synonymous for the expressions sample, pattern, pattern carrier and sample carrier.

The mechanism for the positioning of the sample carrier allows the selective movement of the sample carrier to the reference position or away therefrom. The sample carrier is thereby removed sufficiently far that it does not impede the exposure of a photographic medium or the detection means. In order to achieve a defined positioning of the sample carrier at a reference position, the mechanism preferably includes positioning means, such as, for example, tracks, pivot arms, rotors. Stop means such as, for example, notches or pawls, are preferably also provided. Step motors, especially in connection with a transmission (gears) can also be provided.

The mechanism especially preferably serves a double purpose, namely the positioning of the sample carrier and the positioning of a pressure mask for the pressing of a photographic medium (film) onto a stage (film stage) at the preselected reference position. The films to be captured conventionally rest in film guides along their edges which carry no image. The films are pressed by way of a pressure mask against these edges so that the film image (frame) lies as much as possible in a defined plane, which represents the object plane in the projection geometry. Since the mask is not needed or not necessarily needed when the focus of the exposure is tested by way of the sample carrier, the mechanism is preferably constructed such that it enables the exchange between a mask and the sample carrier. For example, the sample carrier can be on a sled together with one or more masks, whereby either the mask or the sample carrier can be brought into the reference position as desired. The exchange or the positioning of the sample carrier and especially also of the mask is preferably carried out automatically and is controlled by a control arrangement.

Preferably at least one mask is positioned together with the sample carrier on a carrier member, such as, for example, a sled, so that the at least one mask and the sample carrier have a fixed position relative to one another. The carrier member is preferably guided along a preselected path, for example, by way of tracks, or by way of a rotor supported on an axis. The path preferably extends transverse to the transport direction of the film. The positioning along the path can be monitored by way of sensors. If a photoelectric converter is used as the detection means, the detection result, ie. the position of the detection sample detected with the photoelectric converter can also be used in the positioning with a control electronic.

The sample carriers, are preferably positioned between two masks in order to achieve the most compact arrangement and to have the shortest possible adjustment distance between the sample carrier and the mask. The sample carriers can thereby be positioned, for example, in mechanically necessitated spaces between the masks, for example, between fastening means (bolts) or mask frames and particularly have significantly smaller dimensions than the masks (for example smaller than a quarter of the size of a mask), in order to make the arrangement especially compact.

The sample carrier preferably includes a substrate and a sample, which is carried by the substrate. The substrate is preferably rigid and preferably has a planar surface upon which the sample is located. The substrate is constructed in particular so that it does not deform because of the heating action of the light source. A transparent material, for example, glass or transparent plastic, such as, for example, plexiglass, is preferably used for the substrate. The sample can be produced in different ways. For example, reflective or light absorbing material can be vapor deposited according to a preselected pattern onto the substrate. In order to produce the pattern, for example, the substrate can be covered except for the sample. A photo sensitive lacquer can also be applied, exposed according to the sample and thereafter fixed. Also, for example, samples can be scratched into the substrate. The depressions produced thereby can be, for example, filled with a light absorbing and/or light reflecting material.

The thickness of the material which forms the sample is preferably in the size range of the thickness of the photographic layer of a film, whereby the photographic layer represents and carries the image information. In this manner, conditions are produced in the sample carrier as they are also present in a film. The thickness of the sample is, for example, 10 $\mu$m to 100 $\mu$m.

The surface of the substrate need not necessarily be planar, it can also be slightly curved according to the projection geometry in order to compensate for projection errors and to enable an optimal focus adjustment. However, the substrate is preferably planar. In conventional scanners and printers, the photographic layer of the film is normally positioned such that it is directed towards the detector. Accordingly, the sample carrier is preferably positioned such that the substrate is directed towards the light source and the actual sample toward the detector.

It is a significant advantage of the invention that the sample carriers are always positioned the same so that the sample is reproducably always located in the same plane. This was not the case with the use of test films or test images because of the curvature thereof. Depending on the test image used, different focus adjustments could have deceivingly appeared optimal. This problem is overcome because of the reproducably equal positioning of the sample by way of positioning mechanism.

In accordance with the invention, the photographic capturing device includes an arrangement for the automatic testing of the focus and/or the automatic adjustment of the focus. For that purpose, the detection means is preferably a photo-electric converter arrangement onto which the carrier sample is projected. Furthermore, an output electronic and a data processing arrangement (for example a computer, CPU) is provided. The output electronic outputs from the converter arrangement the electrical signals induced by the light and guides them to the data processing arrangement. The signals which represent the image are analyzed by the data processing arrangement with a view to the focussing of the imaged sample.

Particularly, the difference in contrast is used for the assessment of the focus, ie. the light/dark difference between neighboring pixels. For this purpose, the sample is preferably constructed such that the regions cover as few pixels as possible, for example, the number of the covered pixels which have a grey value or an image value above a predetermined threshold value can be known. This number increases in an image out of focus. Sample analysis processes can also be used which are especially sensitive for the edge region of a sample. A parameter can be calculated in this manner for each picture which quantifies the focus of the image. Such a focus determination can also be carried out localized at different locations within the sample, for example, in the four corners of the image. If required, the focus assessment can also be carried out separately in the different colors. If a photochemical converter arrangement is used as the detection means, the measurement image captured by the converter arrangement can be captured (automatically) with a scanner and then analyzed by the data processing arrangement with respect to the focus of the sample. The automatic testing of the focus or adjustment of the focus can therefore be carried out analog to the embodiment with the electrical converter arrangement.

If the data processing arrangement detects a lack of focus, a warning signal can be emitted, for example, which causes an operator to readjust the focus. The testing of the focus adjustment can be carried out at regular intervals in order to thereby guarantee a continuously focussed imaging in the capturing device. The mechanism is therefore provided, for example, with a timer which, if no film is present, positions the sample carrier at regular time intervals at the reference position by way of the mechanism for testing the focus.

The evaluation of the focus is preferably combined with an automatic focussing. A control electronic is preferably provided therefor as well as an adjustment mechanism, which allows the adjustment of at least one of the following devices in their position along the optical image path: the film stage with reference position or object plane, the imaging optics and the detection means. Preferably, the imaging optics (especially an object lens, a lens or a lens system) is adjusted in its position by way of an adjustment mechanism, while the position of the stage and the detection means remains fixed. The adjustment mechanism can be combined, for example, with an electric motor, which is operated by the control electronic. The control can be carried out, for example, according to the conventional nominal/actual principle or according to a fuzzy logic principle.

Preferably, the adjustment is carried out until the focus is within a preselected tolerance range which, for example, as defined by a threshold value.

In an alternative embodiment, the focus is measured at a plurality of positions (for example, 10–20) and a position of optimal focus is subsequently determined from the different points of measurement. The adjustment mechanism subsequently moves to this determined position of optimum focus. If the focus is furthermore measured in each position in different colors, it is possible to even more accurately determine the optimum position or to optimize it especially well for one color.

A carrier member on which at least one pressure mask and the sample carrier are found preferably also includes film guides respectively associated with the pressure masks. The film guides thereby guide the film in a direction which is preferably transverse to the adjustment direction of the carrier member.

In an alternative embodiment, the mechanism for the positioning of the sample carrier can also include a rotor. The latter is preferably mounted for rotational adjustment about an axis. This axis preferably extends at least substantially parallel to the direction of transport of the film or the photographic medium. At its circumference, the rotor preferably includes the sample carrier. In addition, masks (pressure masks) for different film formats can be provided along the circumference. An individual pressure mask or a sample carrier can be selectively guided to the reference position for exposure by rotational adjustment of the rotor.

Further features of the invention are disclosed in the following detailed description of different preferred embodiments. Features of different embodiments can be combined with one another. Equal reference numbers define, unless otherwise indicated, equal parts or parts of similar function.

DETAILED DESCRIPTION OF THE PREFERRED EMBODIMENTS

Figure 1:
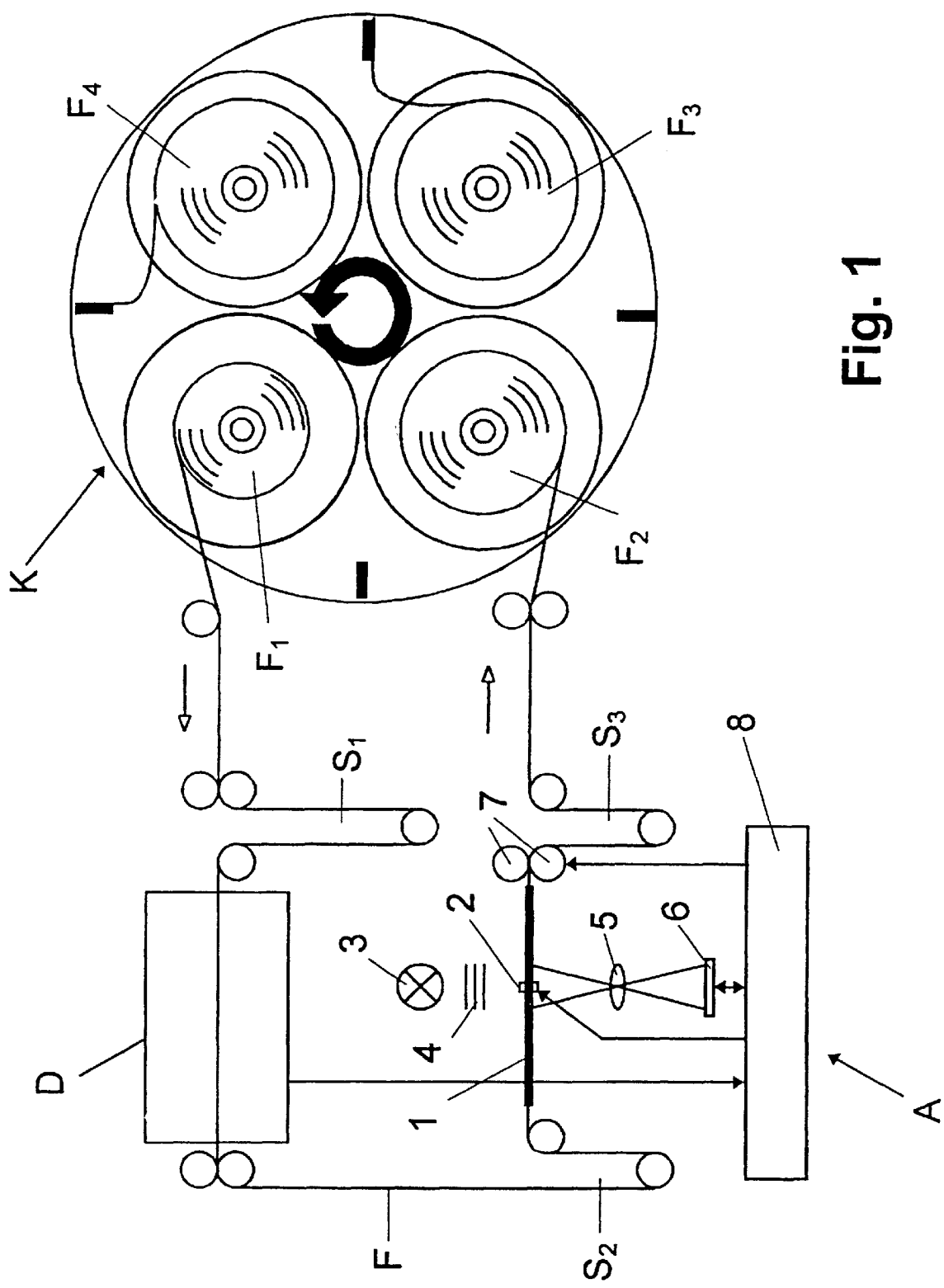
FIG. 1 shows a principle schematic of a preferred embodiment of the capturing device in accordance with the invention.

In the embodiments described in the following, the exemplary photographic capturing device in accordance with the invention is constructed as a scanning device (scanner). A printer can be realized by replacement of the detector (CCD) with photographic paper and a corresponding transport arrangement for the photographic paper. For better understanding, the scanning device in accordance with the invention is illustrated in FIG. 1 together with principally known upstream and downstream components. These components are a rotatable film carousel K with four film reels $F_1$–$F_4$ thereon and an image location (frame) detector D. The film carousel K, the image location detector D and the scanning device which is referred to in its entirety as A are mutually mechanically decoupled by three loop arrangements $S_1$–$S_3$. The film carousel K and the mechanical decoupling by way of the loop arrangements $S_1$–$S_3$ are described in all details in U.S. patent application Ser. No. 09/384,221 (corresponding the European Patent Application No. 98 116 162.3) and therefore do not need to be described in detail.

A film F to be scanned and possibly notched is pulled off the film reel $F_1$, sequentially travels through the image location detector D and the scanning device A and is finally wound onto the film reel $F_2$. The image location detector D determines the relative location of the individual image originals (frames) on the film. The scanning device A analyzes this position information for the positioning of the individual image originals. In detail, this can be carried out, for example, as disclosed in U.S. Pat. No. 5,285,235, so that the person skilled the art does not require further explanation.

The scanning device A itself includes a film stage 1 for the film F to be scanned, a film notching device 2 which is positioned in accordance with the invention on or at the film stage 1, a source of white light 3, for example, a halogen lamp, a color shutter 4 operating, for example, sequentially by color, and imaging optics 5 and a photoelectric converter 6 constructed, for example, as a two-dimensional field of CCD photodiodes. Further provided are means symbolized by rollers 7 for the transport of the film F to the scanning device as well as electronics 8 for the control of all electrical and electronic components of the scanning device, and especially also of the transport and the positioning of the film F or of the image originals thereon.

Figure 3:
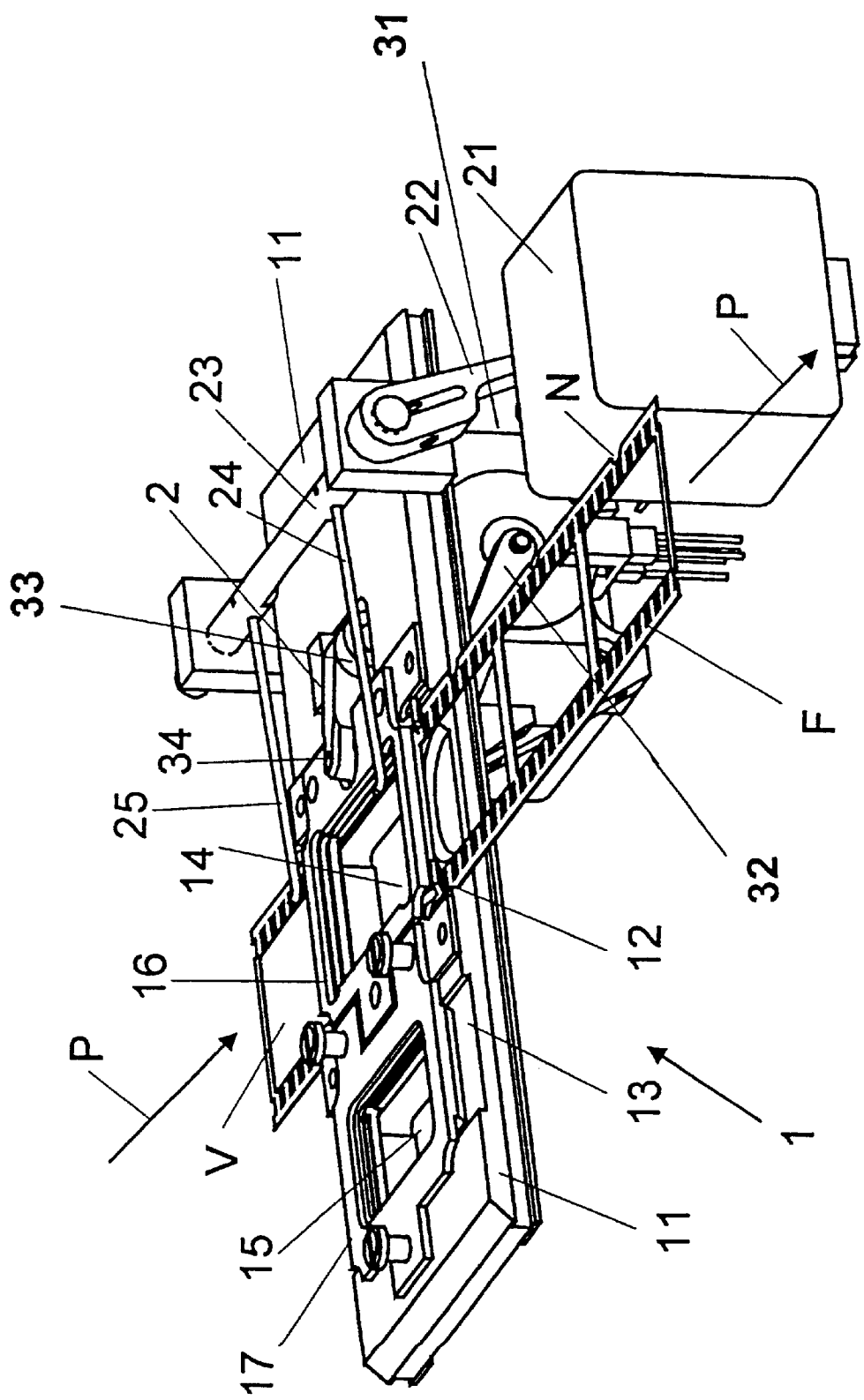
FIG. 3 is an oblique elevational view of the sled of the positioning mechanism of FIG. 2.
Figure 4:
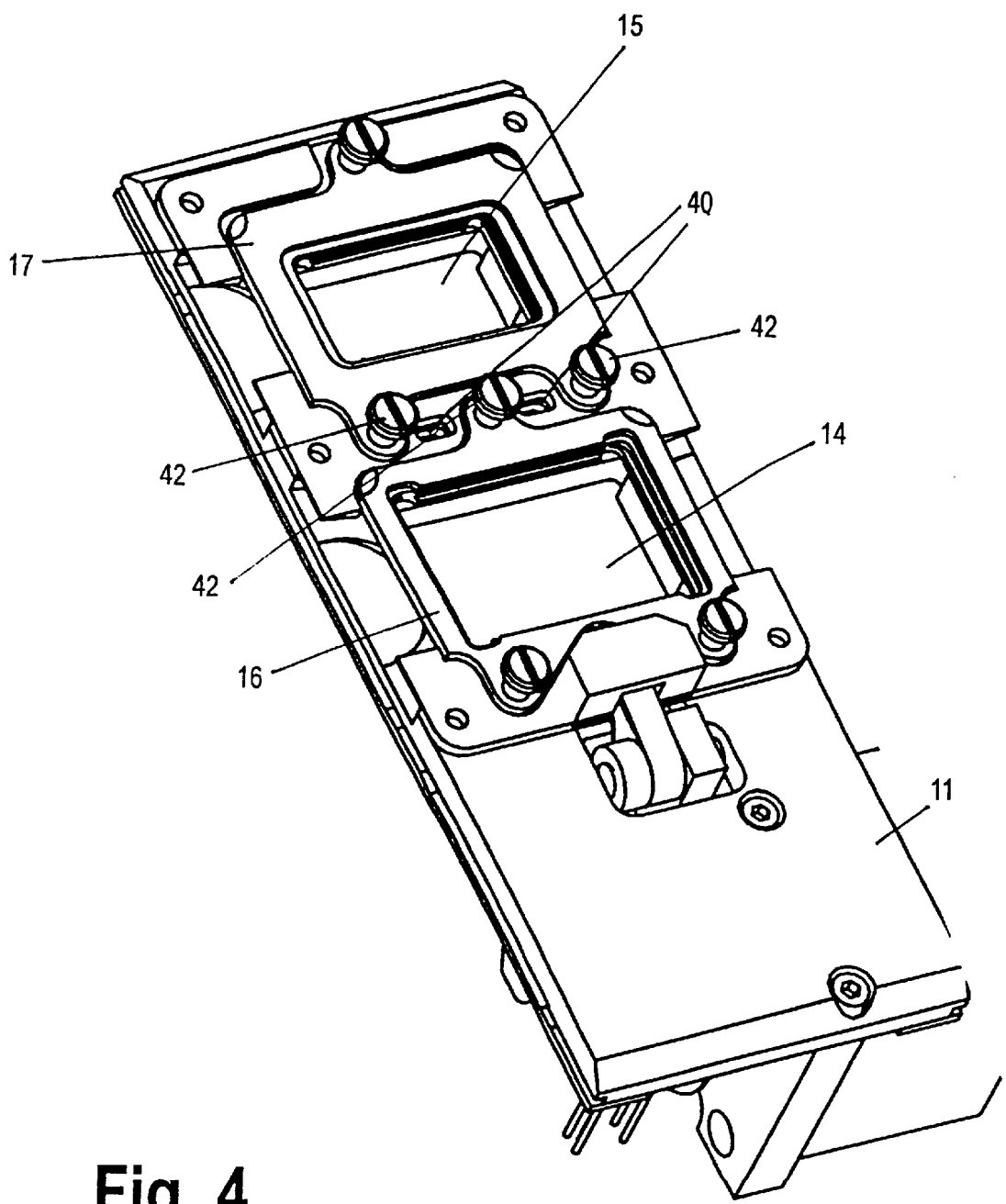
FIG. 4 illustrates the sled of FIG. 3 with sample carriers.

The light emitted by the light source 3 passes the color shutter 4 and impinges on the image originals V to be scanned which are on the film F and positioned in the film stage 1 (FIG. 3). The image originals V are projected by way of the projection optics 5 onto the photoelectric converter 6. The latter locally resolves each image original to be scanned into individual image points and converts the intensity of the measuring light emitted from each individual image point of an image original into a corresponding electric scanning signal. The image original V and, thus, also the photoelectric converter 6 are thereby sequentially exposed under control of the color shutter 4 respectively for a selected exposure time with measuring light of 3 or more different colors and the scanning signals resulting from each exposure being output by the electronics 8 after each exposure.

Figure 2:
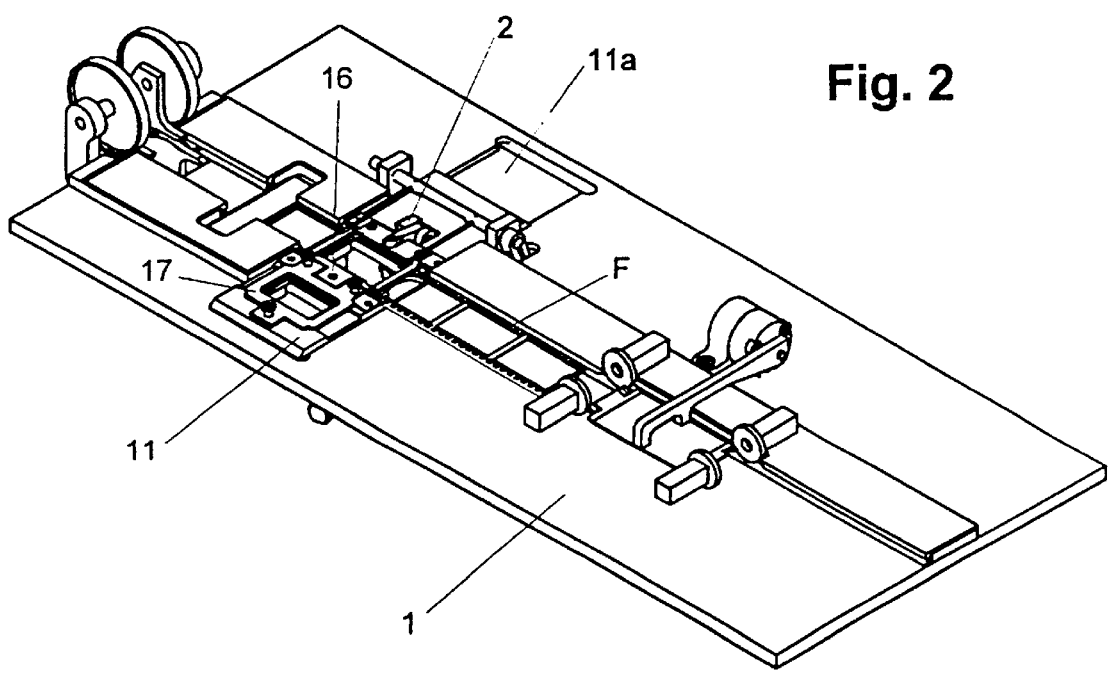
FIG. 2 is an oblique elevational view of the film stage with positioning mechanism of the embodiment shown in FIG. 1.

According to FIGS. 2 and 3, a sled 11 is positioned on the film stage 1, which is positioned on the film stage 1 in a guide 11a for adjustment transverse to the transport path P of the film F. The sled 11 includes two groove-shaped film guides 12 and 13 which are parallel to the transport path P and which are designed for film formats of different width. The film guide 12 is typically adapted to the 135 format and the film guide 13 to the 24 mm format. By adjustment of the sled 11, one or the other film guide 12 or 13 can be respectively moved into the transport path. The sled 11 and the guide 11a represent components of the positioning mechanism for the sample carrier.

A scanning window 14 or 15 is respectively provided in the region of the two film guides 12 and 13. These scanning windows respectively define a scanning position at which the image originals V on the film F are positioned.

A pressure mask 16 or 17 is mounted on the sled 11 respectively above one of the two scanning windows 14 and 15, which masks are adapted to the formats of the films guided in the associated film guides 12 and 13. The pressure masks 16 and 17 are positioned on the sled 11 for movement to the sled and away therefrom. By lowering a pressure mask against the sled located underneath, the film running in the associated film guide can be locked. A stationary electric drive positioned on the film stage 1 is provided for the lowering of the pressure masks, which drive as generally known consists of an electric motor 21, a drive crank 22 driven by the motor, a shaft 23 coupled with the drive crank, and two spring loaded frames 24 and 25 mounted on the shaft and radially extending therefrom. The two spring loaded arms 24 and 25 engage the pressure mask 16 or 17 respectively positioned in the transport path P and push the mask against the sled 11 located thereunder depending on the rotational position of the drive crank 22 and, thus, the shaft 23. The lifting of the pressure mask can be achieved, for example, by a spring loaded support or a spring loaded construction of the mask itself, when the two spring arms 24 and 25 are again rotated upwards.

The film notching device 2 is positioned in the region of the scanning window 14 in the film transport path P and laterally somewhat outside thereof. The notching device 2 is constructed in a conventional manner and essentially includes a drive motor 31, a drive crank 32 driven by the motor and a rockable stamping finger 34 coupled with the crank through a linkage 33. The stamping finger 34 laterally extends into the edge region of the film F and upon each rotation of the drive motor 31 carries out an up and down movement, whereby a semicircular notch N is stamped out from the edge of the film F in a manner generally known.

In operation, the film F to be scanned is stepwise guided along the film transport path P through the scanning arrangement A, whereby each individual image original V on the film is positioned in the scanning window 14. The transport and positioning is carried out in a known manner by way of the motor driven transport rollers 7 controlled by the electronics 8 on the basis of the information delivered by the image location detector D with respect to the location of the individual image originals V on the film F. When an image original V is correctly positioned and the film F is completely stationary, the drive motors 21 and 31 are activated. The film is thereby clamped on the sled 11 by way of the pressure mask 16 and a notch N is stamped from the film edge. After an adjustable short settling phase, the photoelectric scanning of the image original V held in the scanning position is carried out. Subsequently, the pressure mask 16 is lifted again and the stamping finger 34 moved upwardly and the film transported further until the next image original V arrives at the scanning position, and so on.

In order to guarantee a focussed projection, sample carriers 40 or windows 40 for receiving sample carriers are positioned on the sled 11 of the positioning mechanism. A sample carrier with a sample is located in these windows. The sample carrier can be, for example, glass with a sample vapor deposited thereon. The sample absorbs and/or reflects the incoming light at least partially. The sample carrier can also be constructed as a mesh so that the sample carrier itself represents the sample.

In order to guarantee an exact positioning of the sample carrier at a reference position for the projection of the sample onto the detector 6, stop means such as, for example, notches or protrusions can be provided on the sled 11 which releasably engage complimentary stop means which can also be positioned on the film stage in order to achieve a defined positioning for the sample windows 40 as well as the scanning windows 14 and 15.

The sample windows 40 are preferably positioned between the two scanning windows 14 and 15 in order to take up as little room as possible. However, a further sample window of the size of a scanning window can also be provided.

The sample windows 40 are preferably positioned between the fastening means (bolts) 42 which are located between the scanning windows 14 and 15 and fasten the pressure masks 16 and 17, in order to construct the arrangement consisting of mask and sample carrier as compact as possible. The sample windows 40 are preferably also positioned between the edges of the pressure masks 16 and 17.

In order to displace the sled in a defined way and to thereby exactly position the sample carrier at the reference position, a rack can be fastened thereto, for example, along the direction of displacement, which meshes with a pinion of a transmission driven by a controllable electric motor. A defined displacement between the different stop positions can thereby be achieved.

An alternative embodiment for an image capturing apparatus in accordance with the invention is described in the following with reference to FIGS. 5 and 6.

Figure 5:
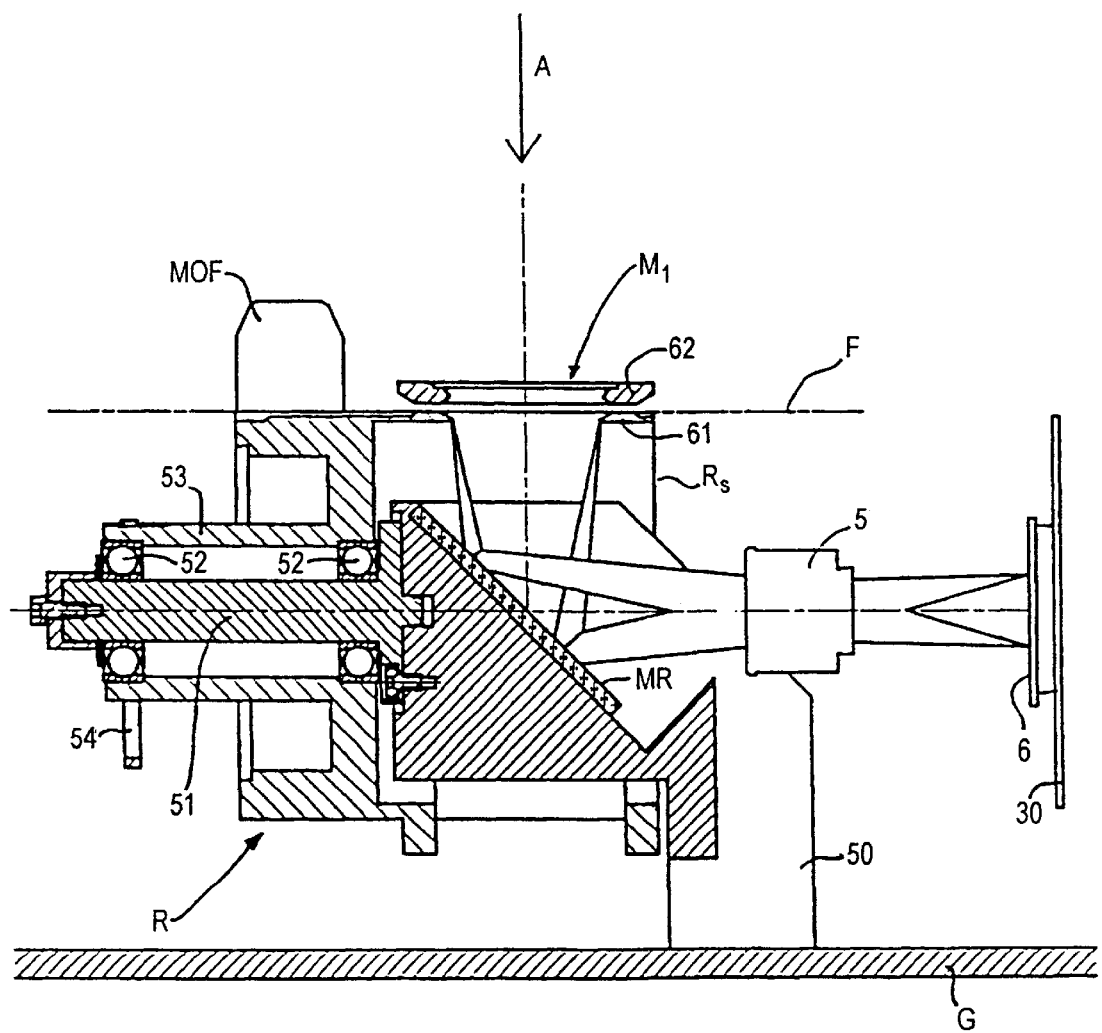
FIG. 5 shows a cross-section through the optical imaging portion of a further embodiment of a capturing device in accordance with the invention.

By rotation of the rotor R, a sample window 100 with installed sample carrier can be brought into the film plane F of the FIG. 5. The focus of the projection can be tested by way of the CCD 6 and the position of the object lens 5 changed as necessary until the projection is in focus. The sample window 100 is then again removed from the film plane (reference position) in that the rotor is again rotated until a mask M1 or M2 (mask M1 in FIG. 6) is located in the reference position for the projection. A film F can thereafter be supplied which is then projected in focus onto the CCD.

The sample captured by the CCD is compared by a CPU with a reference sample for determination of the focus.

An adjustment mechanism with motor (not illustrated) is preferably provided for the changing of the position of the object lens 5, which mechanism is operated by a control electronic which considers the results of the focus assessment.

FIG. 5 shows an exemplary construction for the image capturing apparatus from the film plane F up to the detector 6. The direction of incidence of the light from the light source 3 (FIG. 1) is indicated by the arrow A. The film F is held by a mask M1 which includes a supporting mask 61 and a pressure mask 62 which is positioned at a small spacing above the supporting mask and spring loaded so that a small gap remains between the supporting mask and the pressure mask through which the film F to be scanned is guided. A rotor R is provided on which different masks are mounted. A carrier 50 is mounted to a base plate G, which carrier is essentially made of not further described leg portions which are perpendicular to the base plate and leg portions which are parallel to the base plate. The parallel leg portions extend through the open end face $R_s$ of the rotor and into the latter. The redirecting mirror MR is positioned between the parallel leg portions and reflects the light entering in direction of arrow A and is mounted in such a way that it is slanted at 45° to the baseplate G. A supporting shaft 51 which extends parallel to the base plate G is mounted at the free end of the parallel legs. The rotor R is rotatably mounted thereon by way of a pair of ball bearings 52 and a supporting bushing 53 formed at the rotor R. The supporting bushing 53 and thereby the rotor R are driven by a motor 55 by way of a drive belt 54. The CCD 6 is held by a plate 30.

Figure 6:
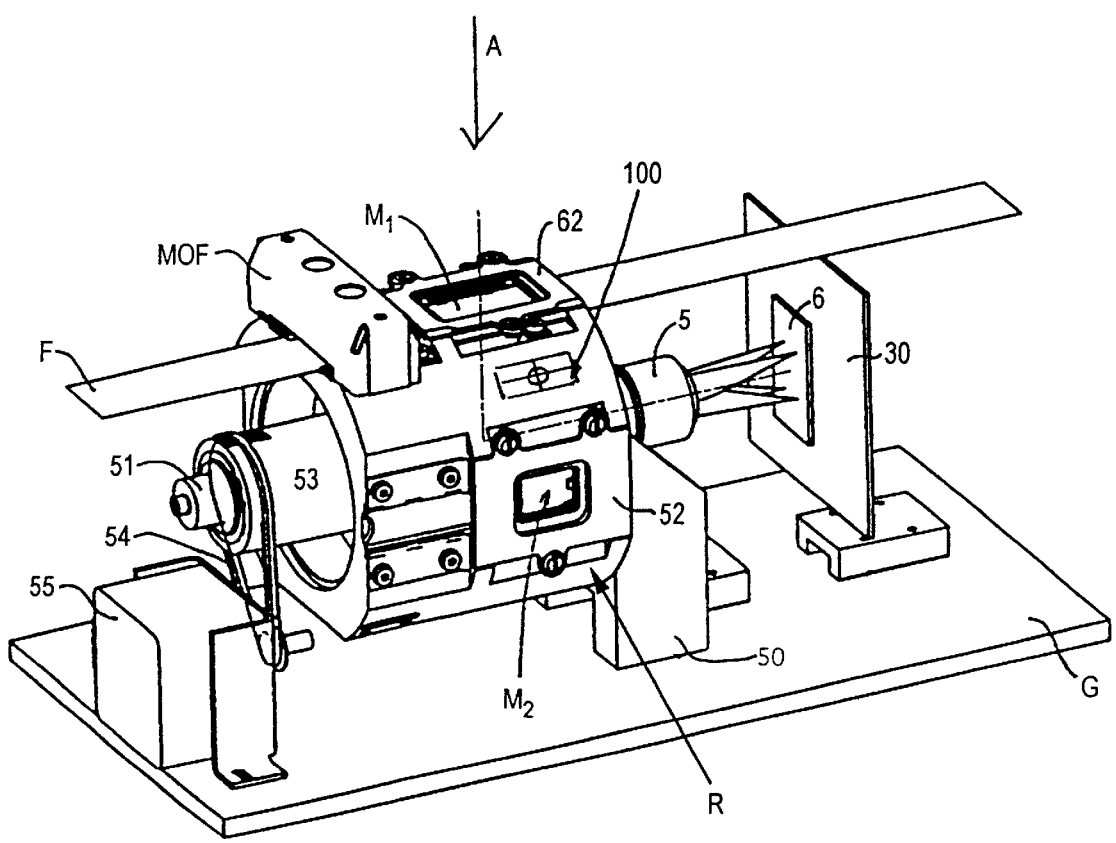
FIG. 6 is a perspective view of the imaging portion shown in FIG. 5.

FIG. 6 shows a perspective of the embodiment of FIG. 5 on which a further mask M2 for another, namely a smaller, film format is apparent. Further provided is a magnetic reader head MOF for the reading of magnetic information on APS films. The rotor together with the film masks form the positioning mechanism for the positioning as required of different film masks and the sample carrier 100 into the reference position preselected for the translumination.

The rotor R is thereby supported for rotatable adjustment about an axis which is essentially parallel to the longitudinal direction of the film transport path. At its circumference, the rotor R has at least two film masks M1, M2 for different film formats as well as a sample carrier with a sample. The film masks and the sample carrier 100 can be selectively placed into the film transport path by rotatable adjustment of the rotor R.

What is claimed is:

1. Photographic capturing device for the capturing of photographic image information from photographic media, comprising:
   a light source;
   a stage for a photographic medium for defining a reference position for a projection of the photographic medium;
   a detection means for detecting light originating from the light source and modulated by the photographic medium according to the image information;
   a projection optics for projecting the photographic medium onto the detection means;
   a rigid sample carrier in connection with the detection means and electronics for controlling the focus of the projection of the photographic medium; and
   a positioning mechanism for removably positioning the rigid sample carrier at the reference position for projection of the rigid sample carrier onto the detection means.

2. The photographic capturing device of claim 1, wherein the positioning mechanism is constructed for exchanging at the reference position at least one mask for holding the photographic medium at the reference position with the sample carrier.

3. The photographic capturing device of claim 2, wherein the positioning mechanism includes one of a sled and a rotor supporting the at least one mask and the sample carrier, for selectively positioning the at least one mask and the sample carrier at the reference position by changing the position of the sled or the rotational position of the rotor.

4. The photographic capturing device of claim 3, wherein at least two masks are provided, the sample carrier being positioned between two adjacent masks.

5. A photographic printer comprising a photographic capturing device according to claim 4.

6. A photographic scanner comprising a photographic capturing device according to claim 4.

7. The photographic capturing device of claim 1, wherein the sample carrier includes a transparent substrate for carrying the sample, whereby the sample lies in a plane and has at least substantially the thickness of a photographic layer of a photographic film, whereby the plane in which the sample is located is positioned in a preselected reference plane by way of the positioning mechanism for controlling the focus.

8. A photographic printer comprising a photographic capturing device according to claim 7.

9. A photographic scanner comprising a photographic capturing device according to claim 7.

10. The photographic capturing device of claim 1, wherein the sample carrier includes a substrate on which the sample is located, whereby the sample is positioned at the reference position by the positioning mechanism in such a way that the substrate is directed towards the light source and the sample is directed towards the detection means.

11. A photographic printer comprising a photographic capturing device according to claim 10.

12. A photographic scanner comprising a photographic capturing device according to claim 10.

13. The photographic capturing device of claim 1, wherein the detection means includes a photo-electric converter arrangement (CCD), a read-out electronics and a data processing arrangement for analysing signals read out from the converter arrangement by the read-out electronics, whereby the data processing arrangement evaluates the focus of the projected sample.

14. The photographic capturing device of claim 13, further comprising a focussing control arrangement for focussing the projected image on the basis of the focus evaluation of the data processing arrangement by changing the ratio of a distance of the stage from the projection optics to the distance of the projection optics to the detection means.

15. The photographic capturing device of claim 14, wherein the data processing arrangement is constructed for separately carrying out an evaluation of the focus for different spectral ranges of the detected light, and the focussing control arrangement is constructed for optimizing the focussing on the basis of the focus evaluations carried out for the different spectral ranges.

16. A photographic printer comprising a photographic capturing device according to claim 15.

17. A photographic scanner comprising a photographic capturing device according to claim 15.

18. A photographic printer comprising a photographic capturing device according to claim 1.

19. A photographic scanner comprising a photographic capturing device according to claim 1.

* * * * *